(12) United States Patent
Takemoto

(10) Patent No.: US 6,603,878 B1
(45) Date of Patent: Aug. 5, 2003

(54) IMAGE PROCESSING METHOD

(75) Inventor: Fumito Takemoto, Kanagawa (JP)

(73) Assignee: Fuji Photo Film Co., LTD, Kanagawa (JP)

(*) Notice: Subject to any disclaimer, the term of this patent is extended or adjusted under 35 U.S.C. 154(b) by 0 days.

(21) Appl. No.: 09/276,463

(22) Filed: Mar. 25, 1999

(30) Foreign Application Priority Data

Mar. 25, 1998 (JP) .......................... 10-077510

(51) Int. Cl.[7] .................................. G06K 9/00
(52) U.S. Cl. .................. 382/167; 358/520; 358/521
(58) Field of Search .................... 358/518–523; 382/162–167, 260–275; 388/518–540

(56) References Cited

U.S. PATENT DOCUMENTS

| | | | | |
|---|---|---|---|---|
| 4,833,532 A | * | 5/1989 | Abe .................... | 358/519 |
| 5,060,060 A | * | 10/1991 | Uadagawa et al. ......... | 358/520 |
| 5,081,485 A | * | 1/1992 | Terashita ................ | 355/38 |
| 5,081,692 A | * | 1/1992 | Kwon et al. ............. | 382/263 |
| 5,528,339 A | * | 6/1996 | Buhr et al. .............. | 355/32 |
| 5,680,230 A | * | 10/1997 | Kaburagi et al. .......... | 358/520 |
| 5,739,922 A | * | 4/1998 | Matama ................. | 358/527 |
| 6,091,861 A | * | 7/2000 | Keyes et al. ............. | 382/299 |

FOREIGN PATENT DOCUMENTS

| | | |
|---|---|---|
| JP | 63026783 | 2/1988 |
| JP | 09022460 | 1/1997 |
| JP | 09083824 | 3/1997 |
| JP | 09138470 | 5/1997 |
| WO | WO 90/07751 | 7/1990 |

* cited by examiner

Primary Examiner—Jingge Wu
(74) Attorney, Agent, or Firm—Birch, Stewart, Kolasch & Birch, LLP

(57) ABSTRACT

The image processing method subjects color negative image signals read photoelectrically from a color negative image to specified image processing. If the color negative image is designated as representing a particular picture, the method subjects the color negative image signals to gradation hardening process in which the gradation of the designated color negative image is rendered harder and subjects the color negative image signals to a hue altering process in which a particular hue in the designated color negative image is altered to a desired hue. The method is capable of reproducing the color negative image as a color print image that has been processed to a reversal-like finish and which provides good appeal and natural impression in a satisfactory way.

11 Claims, 5 Drawing Sheets

IMAGE PROCESSING METHOD

BACKGROUND OF INVENTION

This invention relates to an image processing method for reproducing a visible image from color negative image signals obtained by photoelectrically reading the color negative image carried on a color negative film. The invention particularly relates to an image processing method capable of processing a color negative image to have a finish like color reversal images reproduced from reversal films.

A digital color image reproducing system has been proposed and commercialized as a digital photoprinter. According to the system, the color image recorded on a negative film, a reversal film or a color print is read photoelectrically with a photoelectric transducer such as a CCD (charge coupled device) and converted to digital signals which are then stored as original image signals in an image signal storage means such as a frame memory and the image signals stored in an image data storage means are subjected to image processing to reproduce a color image on a recording material such as color paper or a display means such as a CRT (cathod-ray tube).

An advantage of the digital color image reproducing system is that even if the original color image taken under inappropriate conditions such as under- or over-exposure is recorded on a negative film, a reversal film or a color print, a color image having the desired color and gradation can be reproduced by performing image processing on the obtained original image signals. As a further advantage, the color image recorded on a negative film, a reversal film or a color print can upon request be reproduced as a color image of a different color and gradation.

Reversal prints reproduced from color reversal films are characterized by having a higher overall density and contrast than color negative prints reproduced from color negative films and being capable of rendering the sky deep blue and presenting with good graininess. These features are favored by scenes of landscape. On the other hand, color negative prints reproduced from color negative films are less favorable in the representation of landscape scenes even if they are processed to have an optimal finish.

Particularly in terms of graininess, the digital color image reproducing system produces color reversal prints of better quality than color negative prints for the following reasons. The system requires that the color image carried on a transparency such as a color negative film or a color reversal film be read photoelectrically with transmitted light by an imaging means such as a CCD so that it is converted to color image signals. Therefore, less light is transmitted through the shadow region of the transparency and only weak image signals are captured with the imaging means such as a CCD. On the other hand, more light is transmitted through the highlight region and strong image signals are captured with the imaging means. As a result, the noise of the imaging means is not likely to be superimposed on the image signals captured from the highlight region of the transparency whereas the same noise is highly prone to be superposed on the image signals captured from the shadow region.

The shadow region of a color reversal film corresponds to the shadow region of a color reversal print and is graininess inherently less visible even if noise is superposed. On the other hand, the shadow region of a color negative film becomes the highlight region of a color negative print, so any noise superposed on the captured image signals is sufficiently reproduced to deteriorate the graininess, thereby increasing the visibility of coarse texture.

To deal with these problems, it is strongly desired that the digital photoprinter, when reproducing a color print from a landscape scene on a color negative film, should generate a color image reproduction in which the original landscape scene is processed to produce a reversal-like finish, i.e., as if it were in a color reversal print reproduced from a color reversal film.

SUMMARY OF THE INVENTION

The present invention has been accomplished under these circumstances and has as an objective providing an image processing method that is applicable to the digital image processing of color negative image signals obtained by photoelectric reading of a color negative image and by which an original color negative image, if it represents a particular picture like a landscape scene, can be finished as if it were in a reversal print suitable for the reproduction of the particular picture like a landscape scene.

The stated object of the invention can be attained by an image processing method in which a color negative image is read photoelectrically and color negative image signals obtained by image reading are subjected to specified image processing, comprising the steps of:

if said color negative image is designated as representing a particular picture, subjecting said color negative image signals to gradation hardening process in which the gradation of said designated color negative image is rendered harder; and subjecting said color negative image signals to a hue altering process in which a particular hue in said designated color negative image is altered to a desired hue.

The image processing method may further include the step of performing sharpness enhancing process on said color negative image signals.

Preferably, said sharpness enhancing process is performed by an unsharp masking technique or a graininess suppressing sharpness technique.

In each of the cases described above, said gradation hardening process and said hue altering process are preferably performed on said color negative image signals after setup process is performed.

Said setup process is preferably auto-setup process.

In each of the cases described above, said hue altering process preferably comprises the steps of:

extracting said particular hue from RGB density signals of said color negative image signals;

converting the RGB density signals of the extracted particular hue to pseudo hue, lightness and saturation signals;

determining intensities of said hue, lightness and saturation signals;

thereafter calculating an overall intensity of said particular hue; and adding a preset amount of correction to the calculated overall intensity to generate RGB signals in which the particular hue has been altered to the desired hue.

Said particular picture is preferably a picture of landscape.

Said particular picture is preferably designated by external input.

Preferably, the particular hue which is subjected to said hue altering process is a cyan color of a sky and said desired hue is a blue color.

When said sharpness enhancing process is performed on said color negative image signals, a particular region of said color negative image that has a particular color is lowered in sharpness.

The particular color of the particular region which is to be lowered in sharpness is preferably either the cyan color of the sky, a skin color of a human subject or both.

DETAILED DESCRIPTION OF INVENTION

The image processing method of the invention is now described in detail with reference to the preferred embodiments shown in the accompanying drawings.

Figure 1:
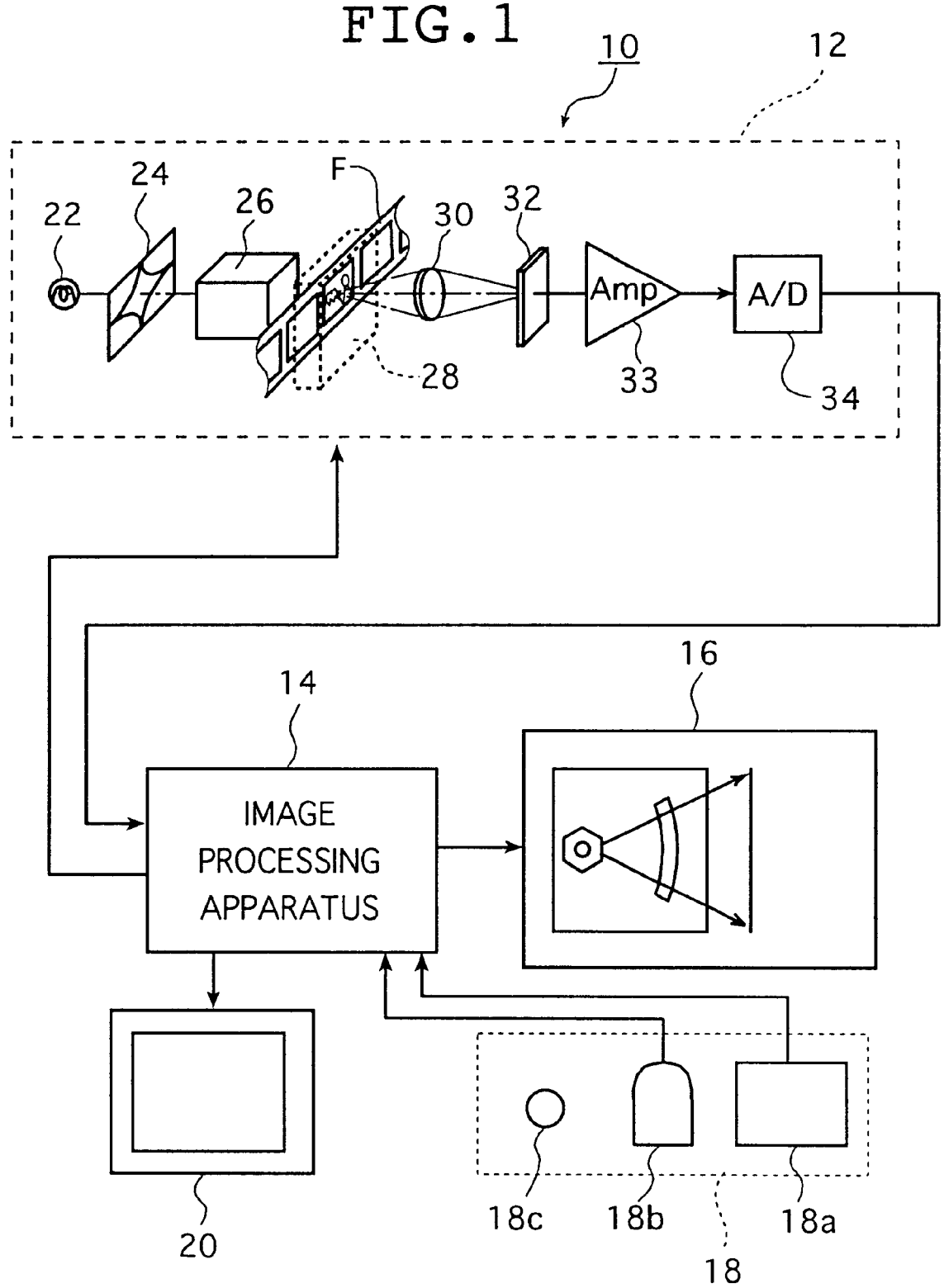
FIG. 1 is a block diagram of an exemplary digital photoprinter to which is applied an image processing apparatus embodying the image processing method of the invention.

FIG. 1 is a block diagram of an exemplary digital photoprinter to which is applied an image processing apparatus embodying the image processing method of the invention. The digital photoprinter indicated by 10 in FIG. 1 (which is hereinafter referred to simply as "photoprinter 10") comprises the following basic components: a scanner (image reading apparatus) 12 for photoelectrically reading the image recorded on a film F such as a color negative film or a color reversal film, an image processing apparatus 14 which performs image processing on the thus read image data (image information), such as image processing by which a particular picture such as a landscape scene in a color negative image is processed to provide a reversal-like finish, and with which the photoprinter 10 as a whole is manipulated and controlled, and an image recording apparatus 16 which performs image-wise exposure of a light-sensitive material (photographic paper) with light beams modulated in accordance with the image data output from the image processing apparatus 14 and which performs development and other necessary processing to output a color negative print having an image processed to provide a reversal-like finish.

Connected to the image processing apparatus 14 are a manipulating unit 18 and a monitor 20. The manipulating unit 18 has a keyboard 18a and a mouse 18b for inputting and setting various conditions such as the designation of particular picture such as a landscape scene (which particular picture is hereinafter sometimes referred to as "landscape scene"), selecting and commanding a specific processing scheme and entering a command and so forth for effecting color/density corrections, as well as a button 18c for designating a particular picture such as a landscape scene in the color negative image which is to be processed to provide a reversal-like finish. The monitor 20 displays the image captured with the scanner 12, various manipulative commands and pictures for setting and registering various conditions.

The scanner 12 is an apparatus with which the images recorded on the film F are read photoelectrically frame by frame. It comprises a light source 22, a variable diaphragm 24, a diffuser box 26 which diffuses the reading light incident on the film F so that it becomes uniform across the plane of the film F, a film (F) carrier 28, an imaging lens unit 30, an image sensor 32 having 3-line CCD sensors capable of reading the densities of R (red), G (green) and B (blue) images, an amplifier (Amp) 33 and an A/D (analog/digital) converter 34.

In the photoprinter 10, dedicated carriers 28 are available that can be loaded into the housing of the scanner 12 in accordance with the type of the film used (e.g. whether it is a film of the Advanced Photo System or a negative or reversal film of 135 size), the format of the film (e.g. whether it is a strip or a slide) or other factor. By replacing one type of carrier 28 with another, the photoprinter 10 can be adapted to process various kinds of films in various modes. The images (frames) that are recorded on the film and which are subjected to the necessary procedure for print production are transported to a specified reading position by means of the carrier 28.

As is well known, films of the Advanced Photo System have a magnetic recording medium that records various information in code format such as the cartridge's ID and film type. The medium is also capable of recording various kinds of data at shooting, development and other times, as exemplified by the date of shooting or development, a scene shot such as a landscape scene, titles such as those of various events and the model of a machine such as a camera or developer. The carrier 28 adaptive to a film (or its cartridge) of the Advanced Photo System is fitted with a means of reading such magnetic information; as the film F is transported to the reading position, the magnetic information is read by the reading means and the thus read various kinds of information such as a landscape scene and the title of an event in which the landscape scene is shot are sent to the image processing apparatus 14.

The scanner 12 captures the image recorded on the film F in the following manner; the uniform reading light from the light source 22 has its quantity adjusted by means of the variable diaphragm 24 and the diffuser 60×26 and is incident on the film F held in the specified reading position by means of the carrier 28 and thereafter passes through the film F to produce projected light bearing the image recorded on it.

Figure 2A:
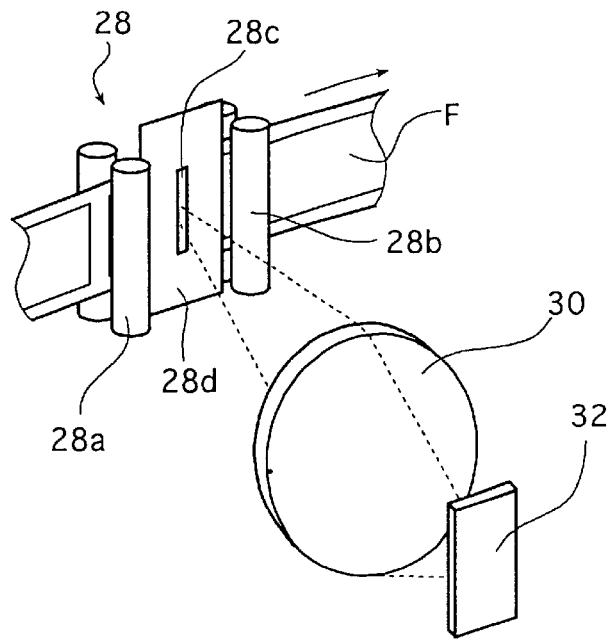
FIG. 2A is a schematic perspective view for illustrating an exemplary carrier to be installed in the digital photoprinter shown in FIG. 1.

The illustrated carrier 28 is adaptive to large lengths (strips) of film F such as 24-exposure films of the size 135 and cartridges of the Advanced Photo Systems. As shown schematically in FIG. 2A, the illustrated carrier 28 has a pair of transport roller pairs 28a and 28b and a mask 28d having a slit 28c. The transport rollers 28a and 28b are provided on opposite sides of the specified reading position in an auxiliary scanning direction which is perpendicular to the main scanning direction (i.e., the direction in which the line CCD sensors, say, RGB 3-line CCD sensors, in the image sensor 32 extend) and they transport the film F with its length being parallel to the auxiliary scanning direction as it is in registry with the reading position. The slit 28c defines the projected light from the film F to have a specified narrow shape, is in registry with the reading position and extends in the main scanning direction.

Being held in registry with the reading position, the film F is transported in the auxiliary scanning direction by means of the carrier 28 as it is illuminated with the reading light. Consequently, the film F is subjected to two-dimensional slit scan with the reading light passing through the slit 28c extending in the main scanning direction, whereupon the image of each frame recorded on the film F is captured.

Figure 2B:
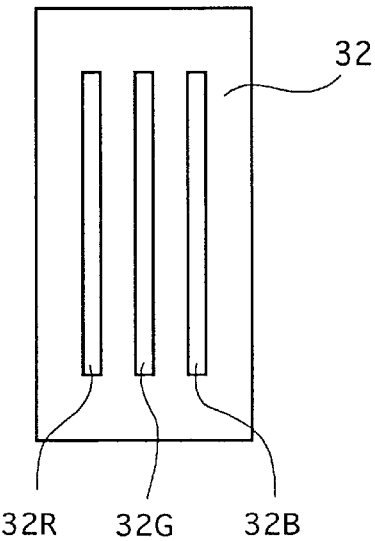
FIG. 2B shows in conceptual form the image sensor in the digital photoprinter shown in FIG. 1.

The projected light from the film is focused by the imaging lens unit 30 to form a sharp image on the light-receiving plane of the image sensor 32. As shown in FIG. 2B, the image sensor 32 is a 3-line color CCD sensor comprising a line CCD sensor 32R for reading R image, a line CCD sensor 32G for reading G image, and a line CCD sensor 32B for reading B image. As already mentioned, the respective line CCD sensors extend in the main scanning direction. The projected light from the film F is separated into three primary colors R, G and B and captured photoelectrically by means of the image sensor 32.

The output RGB signals from the image sensor 32 are amplified with Amp 33, sent to A/D converter 34, where they are converted to RGB digital image data of a certain unit, say, 12 bits, and thereafter sent to the image processing apparatus 14.

In the scanner 12, the image recorded on the film F is captured by two scans, the first being prescan at low resolution and the second being fine scan for obtaining output image data. Prescan is performed under preset reading conditions that ensure that the images on all films F to be handled by the scanner 12 can be read without saturating the image sensor 32. Fine scan uses the prescanned data and is performed under reading conditions that are set for each frame such that the image sensor 32 is saturated at a slightly lower density than the minimum density of the image (frame) of interest. The output image signals for prescan and fine scan are essentially the same data except for resolution and output image signal level.

It should be noted that the scanner 12 to be used in the photoprinter is by no means limited to a type that relies upon the slit scan technique described above but that it may be of a type that relies upon a real exposure, or a technique by which the film image in one frame is scanned across at a time. In this alternative approach, an area sensor such as an area CCD sensor may be used with means of inserting R, G and B color filters being provided between the light source 22 and the film F. One of the color filters is inserted into the optical path of the light issuing from the light source and the reading light passing through the filter is scanned across the film F such that the transmitted light is focused on the area CCD sensor to capture all images on the film. This process of image capturing with the area CCD sensor is performed with R, G and B color filters being sequentially inserted to color separate the images recorded on the film F.

As already mentioned, the digital image data signals output from the scanner 12 are fed into the image processing apparatus 14 embodying the image processing method of the invention.

Figure 3:
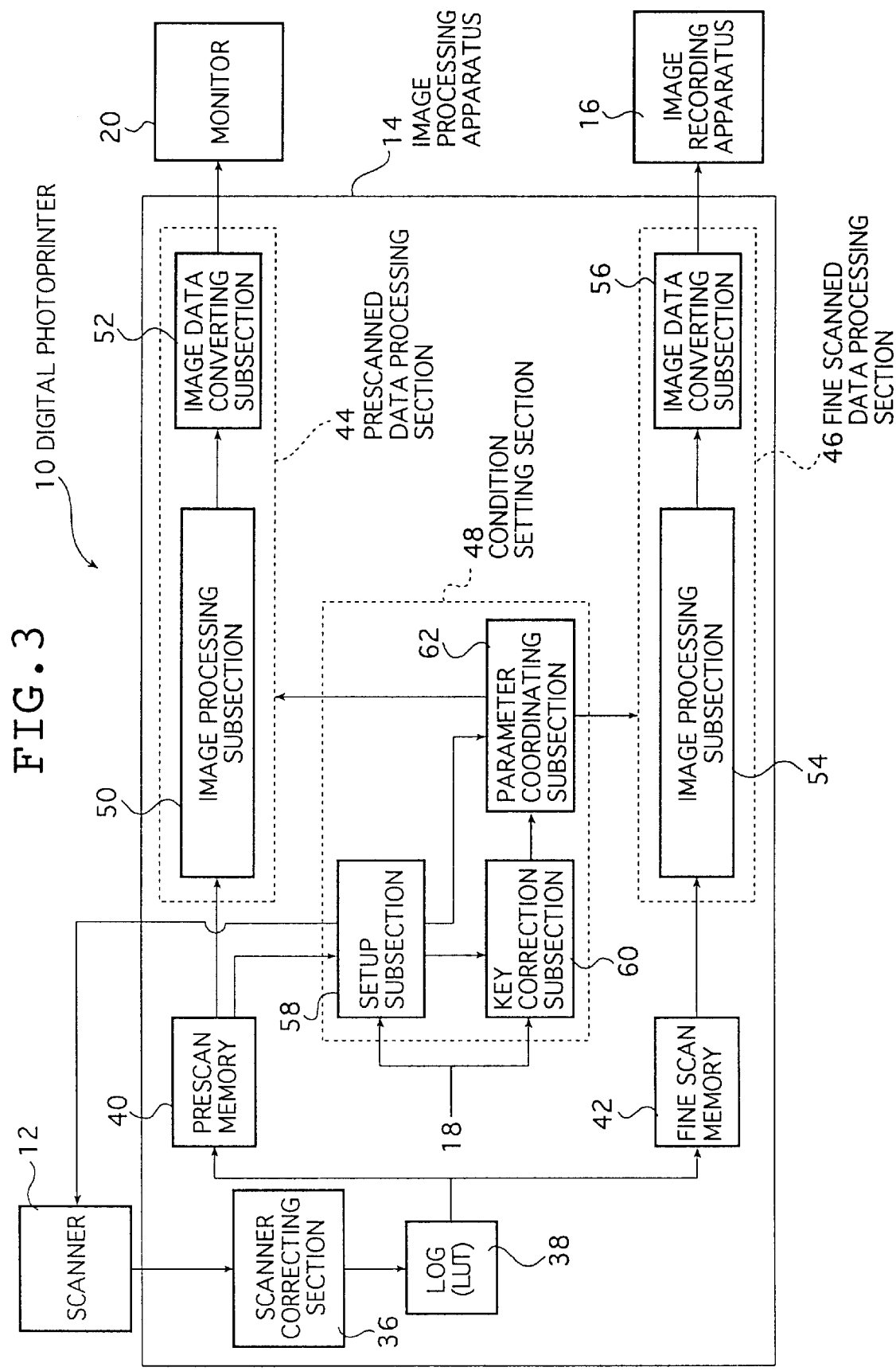
FIG. 3 is a block diagram of an exemplary image processing apparatus in the digital photoprinter shown in FIG. 1 which embodies the image processing method of the invention.

FIG. 3 is a block diagram of the image processing apparatus 14 (which is hereinafter referred to as "processing apparatus 14"). The processing apparatus 14 comprises a scanner correcting section 36, a log converter 38, a prescan (frame) memory 40, a fine scan (frame) memory 42, a prescanned data processing section 44, a fine scanned data processing section 46 as the most characterizing part of the invention which performs image processing to provide a reversal-like finish, and a condition setting section 48.

FIG. 3 shows only the parts related to image processing and besides these parts, the processing apparatus 14 includes a CPU for controlling and managing the overall operation of the photoprinter 10 including the processing apparatus 14, memories for storing the information necessary for the operation and otherwise of the photoprinter 10, and so forth. The manipulating unit 18 comprising the keyboard 18a, mouse 18b and button 18c, as well as the monitor 20 are connected to related parts via the CPU and the like (CPU bus). The button 18c may function as a mode key (button) which is pressed to give a command indicating that the original color negative image represents a particular picture, say, a landscape scene so that the image processing apparatus 14 is operated in a reversal-like finish providing mode in which the input image data is subjected to image processing for providing a reversal-like finish.

The R, G and B image signals such as 12-bit digital image data that are supplied from the scanner 12 into the processing apparatus 14 are fed to the scanner correcting section 36. In order to correct for the variations in sensitivity from pixel to pixel in the RGB digital image data and the dark current which both result from the 3-line CCD sensors 32R, 32G and 32B in the image sensor 32 in the scanner 12, the scanner correcting section 36 performs various steps to correct the captured image data such as DC offset correction, darkness correction, defective pixel correction and shading correction. The digital image signals that have been subjected to the steps of correcting for the pixel-to-pixel variations in sensitivity and the dark current in the scanner correcting section 36 are transferred into the log converter 38.

In the log converter 38, logarithmic transformation is performed such that the digital image data is gradation transformed to digital image density data. In a typical case, the log converter 38 uses look-up tables (LUTs) such that the digital image data, say, those of 12 bit which have been corrected in the scanner correcting section 26 are transformed to digital image density data, say, those of 10 bits (0–1023).

The digital image density data obtained by the transformation in the log converter 38 is stored (or planted) in the prescan memory 40 if it is prescanned image data and stored (or planted) in the fine scan memory 42 if it is fine scanned image data. The prescan memory 40 is a frame memory for performing color-by-color (R, G or B) planting or storage of the low-resolution image density data for one full frame of the film F that have been obtained by prescan of the film F with the scanner 12 and which have been subjected to various steps of data correction and the above-described logarithmic transformation. The prescan memory 40 requires at least a sufficient capacity to plant the 3-color (RGB) image density data from one frame of the film F. Alternatively, it may have a greater capacity to plant the image density data from a plurality of frames. If desired, it may comprise a multiple of memories each having a capacity of one frame.

The prescanned image data stored in the prescan memory 40 is read into the prescanned data processing section 44.

The fine scan memory 42 is a frame memory for performing color-by-color (R, G and B) planting or storage of the high-resolution image density data for one full frame of the film F that have been obtained by fine scan of the film F with the scanner 12 and which have been subjected to various steps of data correction and the above-described logarithmic transformation. Preferably, the fine scan memory 42 has at least a sufficient capacity to plant the 3-color (RGB) image density data from the images in two frames of the film F such that while the image density data from the frame is being written to the memory 42, the image density data from the other frame is read out of the same memory and supplied to the fine scan data processing section 46, where it is subjected to various processing schemes including the process of providing a reversal-like finish which is the most characterizing part of the invention and performed if the original image represents a landscape scene. However, this is not the sole case of the invention and the fine scan memory 42 may have a sufficient capacity to plant the image density data from one frame so that it is adapted to frame-by-frame processing. Alternatively, the fine scan memory 42 may comprise a multiple of one-frame memories so it can typically be used as a toggle memory.

The fine scanned image data stored in the fine scan memory 42 is read into the fine scanned data processing section 46.

The prescanned image data stored in the prescan memory 40 is sent to the prescanned data processing section 44 and subjected to the various image processing schemes necessary to display said data on the monitor 20. The prescanned data processing section 44 has an image processing subsection 50 and an image data converting subsection 52.

The image processing subsection 50 is a site where the image data that has been captured with the scanner 12 and stored in the prescan memory 42 is subjected to auto-setup and other specified image processing schemes such as tonal correction, color transformation and density conversion by means of look-up tables (hereinafter abbreviated as LUTs) and matrix (hereinafter abbreviated as MTX) operations in accordance with the image processing conditions set by the conditions setting section 48 (to be described later) so that a color image of the desired image quality can be reproduced on the CRT display screen of the monitor 20 (to be described more specifically below).

In the image data converting subsection 52, unwanted features of the image data processed by the processing subsection 50 are optionally removed to give a match with the resolution of the monitor 20 and it is similarly converted with a 3D (three-dimensional) LUT or the like into image data that is adaptive to the presentation by the monitor 20 so that it is subsequently displayed on the latter.

The conditions for the processing schemes to be performed in the image processing subsection 50 are set in the conditions setting section 48 which is described later.

The fine scanned image data stored in the fine scan memory 42 is sent to the fine scanned data processing section 46 and subjected not only to the various image processing schemes necessary to provide output in color print form from the image processing apparatus 16 but also to the process of providing a reversal-like finish which is the most characterizing part of the invention. The fine scanned image data processing section 46 has an image processing subsection 54 and an image data converting subsection 56.

The image processing subsection 54 is a site where the image data that has been captured with the scanner 12 and stored in the fine scan memory 42 is subjected to auto-setup and various other image processing schemes by means of LUTs, MTX operation performing units, low-pass filters and adders/subtractors and so forth in accordance with the image processing conditions set by the conditions setting section 48 (to be described later) so that a color image having the desired density, gradation and color tone of color prints and which has been processed to provide a reversal-like finish if the original image represents a landscape scene and has to be processed by the method of the invention can be reproduced on color paper. Examples of the image processing schemes to be performed by the image processing subsection 54 include color balance adjustment, tonal adjustment, color adjustment, density adjustment, saturation adjustment, electronic scaling (magnification), the gradation hardening (the rendering for providing a harder gradation) and the hue alteration (both of which are the characterizing parts of the invention) and sharpness enhancement (edge enhancement or sharpening). Details of these processing schemes will be given later.

In the image data converting subsection 56, the image data processed by the image processing subsection 54 is processed by, for example, a 3D LUT so that it is converted to image data that is adaptive to the image recording by the image recording apparatus 16 and subsequently supplied into the latter.

The image recording apparatus 16 is a site where on the basis of the image data output from the fine scanned data processing section 46, the original image representing a landscape scene is output as a color negative print that reproduces the desired picture of landscape in color after it has been processed to provide a reversal-like finish.

The conditions for the processing to be done in the image processing subsection 54 are set in the conditions setting section 48.

The conditions setting section 48 sets the reading conditions for fine scan, as well as the conditions for the various image processing schemes to be done in the prescanned data processing section 44 and the fine scanned data processing section 46, in particular the conditions for processing a particular picture such as a landscape scene in color negative image to provide a reversal-like finish in accordance with the most characterizing aspect of the invention. The conditions setting section 48 comprises a setup subsection 58, a key correcting subsection 60 and a parameter coordinating subsection 62.

The setup subsection 58 uses the prescanned image data and the like to automatically set the reading conditions for fine scan and supplies them to the scanner 12. In addition, the setup subsection 58 automatically constructs (calculates) the conditions for the various image processing schemes, in particular setup operation, that are to be performed in the prescanned data processing section 44 and the fine scanned data processing section 46, and supplies them to the parameter coordinating subsection 62.

Specifically, the setup subsection 58 reads the prescanned image data from the prescan memory 40 and, on the basis of the acquired prescanned image data, constructs density histograms and calculates image characteristic quantities such as average density, LATD (large-area transmission density), highlight (minimal density) and shadow (maximal density). On the basis of the calculated image characteristic quantities, the setup subsection 58 sets the reading conditions for fine scan including the quantity of light from the light source 22, the aperture size of the variable diaphragm 24 and the storage time of the image sensor 32 (namely, the respective values of line CCD sensors 32R, 32G and 32B), such that the image sensor 32 (i.e., line CCD sensors 32R, 32G and 32B) will be saturated at a slightly lower density than the minimal density of the original image. The reading conditions for fine scan as compared to those for prescan may be determined by changing all elements that correspond to the output levels of the image sensor; alternatively, only one element, say, aperture size may be changed or only selected elements such as the aperture size and storage time may be changed.

On the basis of the density histograms and image characteristic quantities and in response to the operator-entered commands and other optional operations, the setup subsection 58 automatically sets the image processing conditions for the setup of the aforementioned image processing schemes such as color balance adjustment and tonal adjustment.

The key correcting subsection 60 calculates the amounts of adjustment of image processing conditions (e.g. the amount of LUT correction) typically in accordance with the amounts of adjustment of density (brightness), color, contrast, sharpness, saturation and so forth that have been set from the keyboard 18a, mouse 18b and buttons 18c or keys (not shown) on the manipulative unit 18, as well as various commands entered from the mouse 18b. Thus, the key correcting subsection 60 sets the associated parameters and supplies them into the parameter coordinating subsection 62. It should be noted that the manipulative unit 18 has the external button 18c and keys which, either in response to a preliminary instruction or upon the operator's confirmation of the original color image being displayed on the monitor 20, indicates that the original image represents a particular picture such as a landscape scene that has to be processed in accordance with the invention to provide a reversal-like finish. When the operator presses the button 18c or relevant keys, the information designating the particular picture is input to the key correcting subsection 60. If the film F is an APS film, the particular picture may be designated automatically by the operator who supplies the key correcting subsection 60 with the shooting information read from the recorded magnetic information by means of the carrier 28.

After receiving the image processing conditions that have been set by the setup subsection 58, the parameter coordinating subsection 62 sets them in the image processing subsection 50 of the prescanned data processing section 44 and in the image processing subsection 54 of the fine scanned data processing section 46. Further, in accordance with the amounts of adjustment calculated by the key correcting subsection 60, the parameter coordinating subsection 62 either corrects (adjusts) the image processing conditions set in various parts or makes another setting of image processing conditions.

Let us now describe in detail the image processing subsection 54 of the fine scanned data processing section 46 which processes a particular picture such as a landscape scene in color negative image to provide a reversal-like finish in accordance with the most characterizing aspect of the invention.

Figure 4:
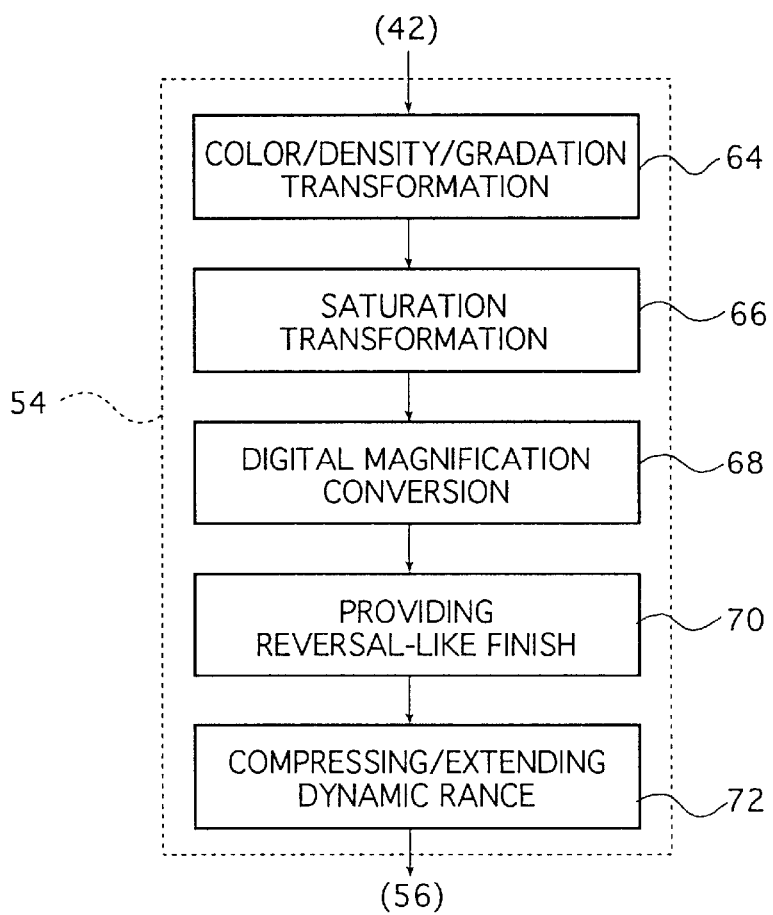
FIG. 4 is a block diagram of an exemplary image processing subsection in a fine scanned image data processing section of the image processing apparatus shown in FIG. 3.

FIG. 4 is a block diagram showing details of an example of the image processing subsection 54, which comprises the following components: a color/density/gradation converting means 64 which performs auto-setup of the image data read from the fine scan memory 42 to convert it into density, color and gradation data; a saturation converting means 66 which converts the saturation of the image data; a digital magnification converting (electronic scaling) means 68 which converts the number of pixels in the image data; a reversal-like finish providing means 70 which processes the image data to provide a reversal-like finish in accordance with the invention if the landscape button 18c is depressed or the recorded magnetic information is referenced to indicate that the original color image represents a particular picture such as a landscape scene; and a dynamic range extend compress means 72 that performs dodging (i.e. the extension and compression of the dynamic range) on the image data.

The color/density/gradation converting means 64 in the image processing subsection 54 receives from the parameter coordinating subsection 62 the setup conditions automatically set in the setup subsection 58 of the conditions setting section 48. In accordance with the received setup conditions, the converting means 64 uses a LUT and the like to perform auto-setup of the image data and converts it into density data, color data and gradation data. The saturation converting means 66 performs MTX operations and the like to convert the saturation data of the image data obtained by the converting means 64. The electronic scaling means 68 adjusts the number of pixels in the image data by interpolating or removing unwanted features of the saturation-converted image data both in accordance with the size of the color image to be output on color paper in the image recording apparatus 16 and in compliance with the output pixel density.

Details of the reversal-like finish providing means 70 will be given later and suffice it here to say that if the color image of interest represents a particular picture such as a landscape scene, the image data that has been electronically scaled to predetermine values of output size and output pixel density by the electronic scaling means 68 is subjected to the processes of gradation hardening, hue alteration and sharpness correction so that the contrast of the image is increased, a particular hue such as the cyan hue of the sky is altered to a desired hue such as a blue hue and, if necessary, the sharpness of a particular color such as the skin color of a human subject or the cyan color of the sky is reduced, thereby ensuring that even a color negative image can be processed to provide a finish like that of a color reversal print. In the illustrated case, the image data to be input to the reversal-like finish providing means 70 is what has been electronically scaled by the electronic scaling means 68. However, this is not the sole case of the invention and any image data that has been already set up may be input to the reversal-like finish providing means 70. It should be noted that if the color image of interest does not represent a particular picture such as a landscape scene or if there is no need to provide a reversal-like finish, the electronically scaled image data may be simply passed through the reversal-like finish providing means 70 without letting the latter perform any processing; alternatively, the image data may only be subjected to the process of sharpness correction, particularly, sharpness enhancement.

If necessary, the dynamic range compress/extend means 72 generates a blurred image by extracting the low-frequency component of the image data that has been processed by the means 70 to provide a reversal-like finish. The blurred image signal, after being compressed or extended as appropriate, is subtracted from the original image so that the dynamic range of the image is compressed or extended in accordance with the density range that can be represented by the output medium such as color paper or output device. In other words, dodging is performed by the dynamic range compress/extend means 72.

In the illustrated case, the color image data supplied into the image processing subsection 54 is subjected to all processing schemes that are performed by the color/density/gradation converting means 64, saturation converting means 66, electronic scaling means 68, reversal-like finish providing means 70 and dynamic range compress/extend means 72. However, this is not the sole case of the invention and as long as the image data that has been set up can be processed by the means 70 to provide a reversal-like finish, at least part or all of the other means may be eliminated or they may partly or entirely be inactivated to perform the intended processing.

Figure 5:
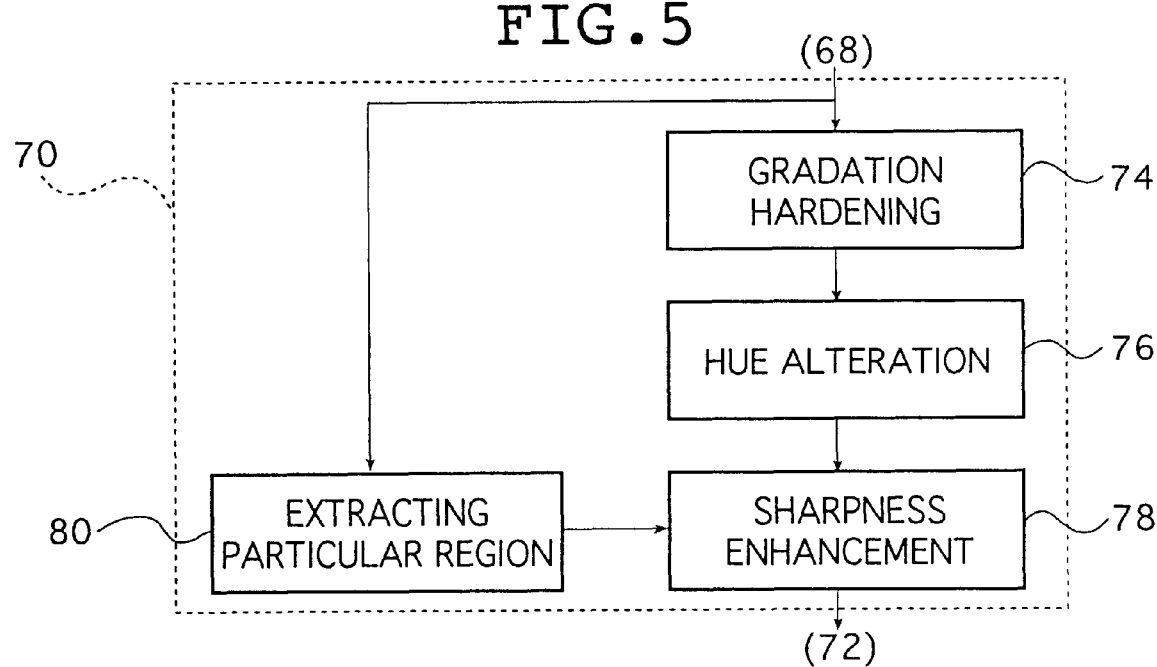
FIG. 5 is a block diagram of an exemplary reversal-like finish providing means in the image processing subsection shown in FIG. 4.

The reversal-like finish providing means 70 is the most characterizing part of the invention and, as shown in FIG. 5, has a gradation hardening means 74, a hue altering means 76, a sharpness enhancing means 78 and a particular region extracting means 80.

Figure 6:
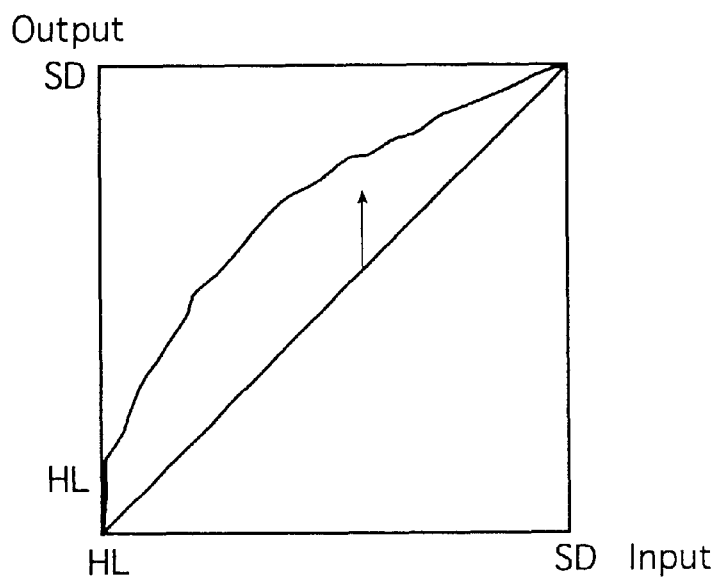
FIG. 6 is a graph showing an exemplary gradation transforming curve for illustrating the gradation hardening process that is performed in the reversal-like finish providing means shown in FIG. 5.

The information about a particular picture such as a landscape scene, which is input either direct from the manipulative unit 18 having the landscape button 18c, keyboard 18a and the mouse 18b or after the operator's confirmation of the color image displayed on the monitor 20, is supplied into the key correcting subsection 60 of the conditions setting section 48. The gradation hardening means 74 receives that information via the parameter coordinating subsection 62 and increases the image in gradation hardness, with the gradation curve of the as-setup image data convexing upward as shown in FIG. 6. Stated more specifically, the gradation hardening means 74 does not squash the highlights and/or shadows by increasing the slope ($\gamma$) of the gradation curve; instead, as shown in FIG. 6, the input highlight and shadow as well as the output highlight and shadow are fixed and the gradation curve c is allowed to rise abruptly near the input highlight point, convex upwardly in the intermediate tone and level off near the input shadow point, thereby producing a blown-up gradation curve to increase the image in gradation hardness, that is, to render the image to have a higher contrast.

For use in the processing by the gradation hardening means 74, the gradation curve c shown in FIG. 6 is preferably formatted as a one-dimensional lookup table (1D LUT). This however is not the sole case of the invention.

The hue altering means 76 is a device by which a particular hue such as the cyan hue of the sky in color negative image is altered to a desired hue such as a blue hue that has good appeal without producing any unnatural impression. The method of the alteration that is performed by the hue altering means 76 is not limited to any particular type and known methods of color modification and correction may be employed. Preferably, the color correction method disclosed in commonly assigned Unexamined Published Japanese Patent Application (kokai) No. 83824/1997 is employed.

Figure 7:
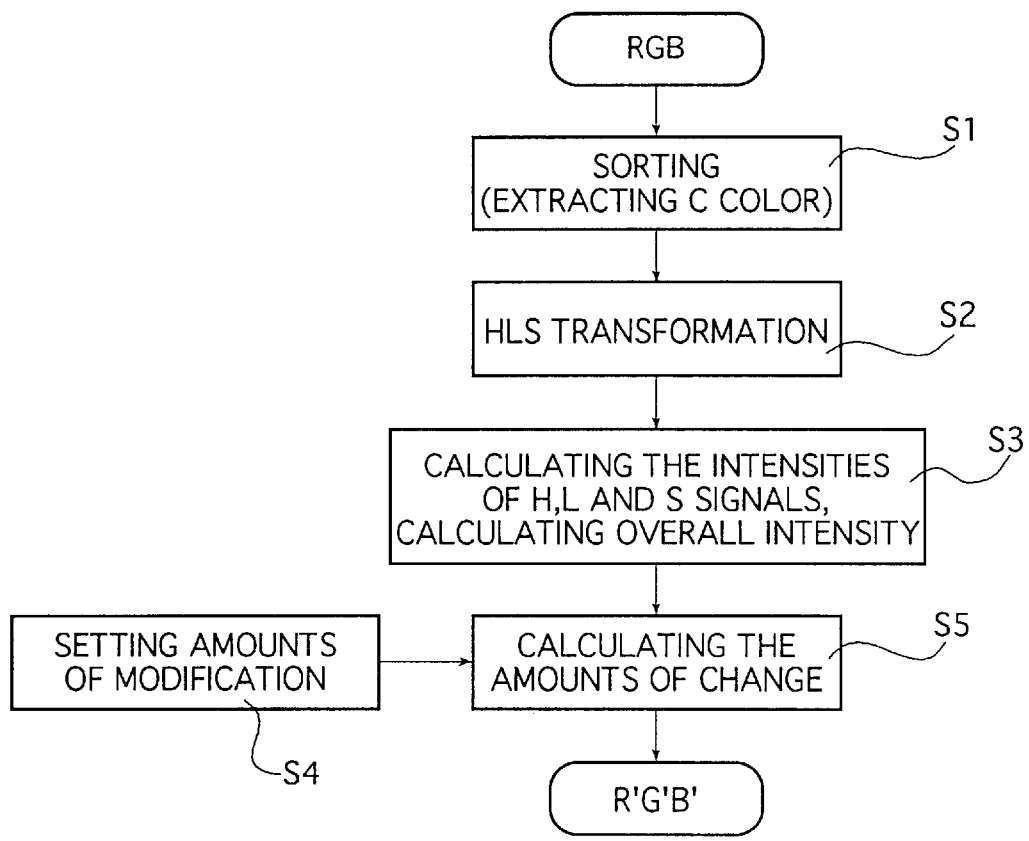
FIG. 7 is a flowchart showing an exemplary flow of the process of hue alteration that is performed in the reversal-like finish providing means shown in FIG. 5.

FIG. 7 shows a flowchart of color alteration that is performed by the hue altering means 76 employing the color modification method disclosed in commonly assigned Unexamined Published Japanese Patent Application (kokai) No. 83824/1997, supra. As shown, the first step in the sequence is extracting a particular hue such as the cyan color of the sky in a landscape scene from RGB image signals that have been rendered to have a harder gradation by the gradation hardening means 74 (Step S by a particular hue extracting means). In the next step, the RGB image signals of the extracted particular hue are subjected to HLS transformation so that they are converted to three pseudo signals, hue signal H, lightness signal L and saturation signal S (Step 2 by an HLS transforming means). Suppose here that the hue signal H is set to lie within the range of $0.0 \leq H < 6.0$, the lightness signal L within the range of $0.0 \leq L \leq 1.0$, and the saturation signal S within the range of $0.0 \leq S \leq 1.0$; also suppose that H values of 0, 1, 2, 3, 4 and 5 represent the hues of R, Y, G, C, B and M, respectively. In this case, HLS transformation can be determined from maxima, intermediates and minima of the RGB image signals.

The respective signals of the thus obtained hue signal H, lightness signal L and saturation signal S are processed by preset color modified intensity functions for the respective hues of R (red), Y (yellow), G (green), C (cyan), B (blue) and M (magenta) so as to calculate respective intensity signals (hereinafter referred to simply as "intensities") in the directions of hue H, lightness L and saturation S, and the overall intensity is calculated (Step 3 by an intensity calculating means).

Suppose here that the preset color modified intensity functions comprise a hue direction intensity function $F_i(H)$ and a lightness/saturation direction intensity function $F_i(L, S)$ (i=R, Y, G, C, B, M) and also suppose that each of the calculated intensity signals comprises a hue H direction intensity signal $vh_i$ and a lightness L/saturation S direction intensity signal $va_i$ (i=R, Y, G, C, B, M). Then, the hue H intensity $vh_i$ for color i and the lightness L/saturation S intensity $va_i$ for the same color can be calculated by the following equations (1) and (2):

$$vh_i = F_i(H) \qquad (1)$$

$$va_i = F_i(L, S) \qquad (2)$$

Thus, the hue H intensity $vh_i$ and the lightness L/saturation S intensity $va_i$ can be calculated for the six colors of i=R, Y, G, C, B and M.

From the thus obtained hue H intensity $vh_i$ and lightness L/saturation S intensity $va_i$, the overall intensity of color i (i modified intensity signal) can be calculated by the following equation (3):

$$v_i = vh_i \cdot va_i \qquad (3)$$

Thus, the overall intensities of six colors i=R, Y, G, C, B and M can be determined.

If the intensity functions F in equations (1) and (2) are given as continuous functions, they may be operated upon as such. If the functions are given in discrete values, for example, as tables like LUTs, operations may be performed by means of two-dimensional linear interpolation. In the present invention, it is preferred that a hue direction intensity table (2D LUT) and a lightness/saturation direction intensity table (2D LUT) are preliminarily determined and set in the conditions setting section 48 or the hue altering means 76.

As described in Unexamined Published Japanese Patent Application (kokai) No. 83824/1997, supra, the hue direction intensity function $F_i(H)$ and lightness/saturation direction intensity function $F_i(L, S)$ may be constructed from both image signals for a particular hue such as the cyan color of the sky in color negative image and image signals for the desired hue to which the particular hue should be altered. Alternatively, these functions may be constructed from image signals obtained by scanner or otherwise reading of color charts including the stated two hues.

In a separate step from the color modified intensity functions such as the hue direction intensity function $F_i(H)$ and lightness/saturation direction intensity function $F_i(L, S)$ (i=R, Y, G, C, B, M), as well as the amounts of modification of the respective hues R, Y, G, C, B and M for each of the colors R, G and B which may be referred to as color correction coefficients and expressed by $RC_{ij}$ (i=R, Y, G, C, B, M; j=R, G, B) are preliminarily set (Step 4 by a modification amount setting means).

These settings of $RC_{ij}$ representing the amounts of modification of the respective hues R, Y, G, C, B and M are multiplied by the overall intensities $v_i$ (as calculated in Step S3) in accordance with the following equation (4), thereby determining unit color i modified signals $u_{ij}$ for j colors (i=R, Y, G, C, B, M; j=R, G, B);

$$u_{ij}=v_i \cdot RC_{ij} \quad (4)$$

Subsequently, the unit color i modified signals $u_{ij}$ for j colors (i=R, Y, G, C, B, M; j=R, G, B) are summed in accordance with the following equation (5), thereby determining the amounts of change $\Delta_j$ in the respective image signals for j colors (j=R, G, B) that occurs from the hue alteration (Step 5 by a change calculating means):

$$\Delta_j = u_{Rj} + u_{Yj} + u_{Gj} + u_{Cj} + U_{Bj} + u_{Mj} \quad (5)$$

Thus, the amounts of change $\Delta R$, $\Delta G$ and $\Delta B$ in the image signals for the respective colors R, G and B can be determined.

In the final step, the thus determined amounts of change $\Delta R$, $\Delta G$ and $\Delta B$ in the image signals for R, G and B are respectively added to the RGB original image signals as dictated by the following set of equations (6), thereby generating RGB density signals R', G' and B' that have been altered to the desired hue:

$$R'=R+\Delta R$$
$$G'=G+\Delta G \quad (6)$$
$$B'=B+\Delta B$$

Described above is the manner in which the hue altering means 76 obtains RGB image signals that has been subjected to the alteration of a particular hue such as the cyan color of the sky in a landscape scene to the desired hue such as a blue color.

The thus hue-altered RGB image signals (image data) are then supplied from the hue altering means 76 into the sharpness enhancing means 78. The sharpness enhancing means 78 is a device for enhancing the edges or contours of a color image, a process generally referred to as "sharpness enhancement". The sharpness enhancing means 78 may be of a type that enhances the sharpness of the entire part of the color image but preferably it is of such a type that performs "sharpness correction", or sharpness enhancement that is performed in such a way as to lower the sharpness of a particular region of a particular color such as the skin color of a human subject or the cyan color of the sky. Particularly in the case of image processing intended to provide a reversal-like finish, the process of increasing the image in gradation hardness is also performed. In addition, compared to color negative prints, color reversal prints from the images on color reversal films are inherently lower in noise and graininess deterioration at the highlight. Therefore, in the range from the intermediate density to the highlight, sharpness is preferably reduced in a particular region where graininess is highly visible, such as the skin of a human subject or the cyan of the sky.

Methods of sharpness enhancement are by no means limiting and known techniques are applicable. Preferred techniques of sharpness enhancement include the unsharp masking technique and the graininess suppressing sharpness enhancement technique as disclosed in U.S. Pat. No. 4,812,903, Unexamined Published Japanese Patent Application (kokai) No. 26783/1988, Japanese Patent Domestic Announcement (kohyo) No. 502975/1991 and commonly assigned Unexamined Published Japanese Patent Application (kokai) No. 22460/1997.

In sharpness enhancement by the unsharp masking (USM) technique, a given mask size is averaged with surrounding pixels to generate an unsharp mask signal Sus from color original image signals and unsharp masking is subsequently performed in accordance with the following equation (7) to generate a sharpness signal Ss:

$$Ss = Sorg + K \cdot (Sorg - Sus) \quad (7)$$

where Sorg is a color original image signal and K is a sharpness enhancement coefficient.

In the sharpness enhancement by the unsharp masking (USM) technique, the value of the sharpness enhancement coefficient K in the equation (7) is adjusted, or reduced to state more specifically, in the particular region of the skin color of a human subject or the cyan color of the sky that has been extracted by a particular region extracting means 80 to be described later, whereby the degree of sharpness enhancement, namely, the sharpness, can be adjusted, namely reduced.

Speaking now of the graininess suppressing sharpness technique, the graininess suppressing sharpness enhancement described in Japanese Patent Domestic Announcement (kohyo) No. 502975/1991 comprises detecting a flat portion and a texture/edge portion from a color image by a local dispersion method and reducing the value of the sharpness enhancement coefficient K in the flat portion while increasing the K value in the texture/edge portion so that the noise and graininess are suppressed while the texture and edge (contour) are accentuated to enhance sharpness. If the method under discussion is to be used in the invention, the value of the sharpness enhancement coefficient K to be used is varied between the flat portion and the texture/edge portion and, at the same time, the K value is made even smaller in the extracted particular region of the image than in the flat portion as in the aforementioned unsharp masking method, whereby the deterioration of graininess is suppressed and the sharpness adjusted to provide a reversal-like finish.

According to the graininess suppressing sharpness enhancement described in U.S. Pat. No. 4,812,903 and Unexamined Published Japanese Patent Application (kokai) No. 26783/1988, color image signals are filtered or otherwise treated to be separated into a low-frequency component and a high-frequency component and the two components are combined after the high-frequency component is accentuated. In this method, not only the degree of enhancement of the high-frequency component, such as the enhancement coefficient and gain, but also the intensity of the treatment applied to the low-frequency component, such as the intensity coefficient and gain, is adjusted, say, reduced in the extracted particular region of the image, whereby the sharpness is appropriately adjusted to provide a reversal-like finish.

According to the graininess suppressing sharpness enhancement described in commonly assigned Unexamined Published Japanese Patent Application (kokai) No. 22460/1997, color original image signals are resolved into a low-frequency component, an intermediate-frequency component and a high-frequency component, with a luminance component being preferably extracted from the intermediate-and high-frequency components and, solely on the basis of the luminance component, the high-frequency component is accentuated and the intermediate-frequency component suppressed, followed by combining the low-, intermediate- and high-frequency components. As in the case of the graininess suppressing sharpness enhancement described in U.S. Pat. No. 4,812,903 and Unexamined Published Japanese Patent Application (kokai) No. 26783/1988, supra, the settings of the gain and the intensity of treatment for the respective frequency components are adjusted, say, reduced in the extracted particular region of the image, whereby the sharpness is appropriately adjusted to provide a reversal-like finish.

Here is what is performed by the particular region extracting means 80. Using the color image data fed into the reversal-like finish providing means, the means 80 extracts pixels having a particular color that is set on the basis of the information about the chromaticity range of a particular color of a particular region to be reduced in sharpness, for example, the skin color of a human subject or the cyan color of the sky that has been set as an image processing condition from the parameter coordinating section 48, and the information about their coordinates (position) is extracted. This procedure is repeated to extract the whole of the particular region and all of its coordinates.

The coordinate (position) information about the particular region thus extracted by the particular region extracting means 80 is sent to the sharpness enhancing means 78, where it is subjected to such sharpness enhancement that the sharpness of the particular region extracted by the particular region extracting means 80 becomes lower than the sharpness of the other regions.

In the illustrated case, the image data signals to be used by the particular region extracting means 80 to extract the particular region are the color image data signals that have been fed into the reversal-like finish providing means 70 after electronic scaling by the electronic scaling means 68. This is not the sole case of the invention and other kinds of image data may be used, as exemplified by the following: the image data read from the fine scan memory 42; the image signals processed by various means in the image processing subsection 54; the image data read from the prescan memory 42; the image signals that have been subjected to various processing schemes in the image processing subsection 50 of the prescanned data processing section 44; and the image signals to be displayed on the monitor 20 after being processed in the image data converting subsection 52.

The method of extracting the particular region is not particularly limiting and any methods that are generally known to be capable of extracting the principal part of an image may be employed. To mention a few examples, they include: a method in which the operator designates a point in the principal part of an image using the mouse 18b or the like and then extracts the principal image on the basis of an appropriate factor such as color continuity; a method in which the operator cuts out the principal part of an image using the mouse 18b; and a method in which the principal part of an image is automatically extracted using a known principal part extracting algorithm.

An example of the algorithm for automatically extracting the principal part of an image is described in Unexamined Published Japanese Patent Application (kokai) No. 138470/1997; different methods of extracting the principal part of an image such as by extracting a particular color, a pattern of particular shape and a region that presumably corresponds to the background are preliminarily evaluated to determines weights for the respective methods, the principal part of an image of interest is extracted by these methods and weighted by the determined weights; the result of the weighting is used as a criterion for checking for the appropriateness of the extracted principal part, which is finally extracted if it is found appropriate. Other methods of extracting the principal part of an image that can be used with advantage are described in Unexamined Published Japanese Patent Application (kokai) Nos. 346333/1992, 158164/1993, 165120/1993, 160993/1994, 184925/1996, 101579/1997, 138471/1997, etc.

The particular image to be processed by the reversal-like finish providing means 70 in accordance with the invention may be of any kind as long as it is a color negative image that need be processed to have a reversal-like finish and a preferred example is a negative image representing a landscape scene.

The particular color to be altered to a desired color by the hue altering means 76 may be of any hue in a particular picture which, when processed to provide a reversal-like finish, comes to have good appeal without giving any unnatural impression. To mention just one example, if the particular picture is a landscape scene, the particular color is preferably the cyan color of the sky and the desired color is preferably a blue color.

The particular region to be extracted by the particular region extracting means 80 in order to lower sharpness in accordance with the invention may be of any kind as long as it is a region of a particular color which, when subjected to the process of providing a reversal-like finish by the reversal-like finish providing means 70, in particular, increasing in gradation hardness by the gradation hardening means 74 or sharpness enhancement by the sharpness enhancing means 78, deteriorates in noise such as graininess to have a visible coarse texture. A preferred example is a subject or a principal subject occupied by an important color of a mild gradation such as the skin color of a human individual or the cyan color of a clear unclouded sky.

Thus, image data signals are subjected to sharpness enhancement by the sharpness enhancing means 78 after lowering the sharpness of the particular region extracted by the particular region extracting means 80 in the reversal-like finish providing means 70. Even if these image data signals are from a color negative image representing a landscape scene, they can be processed to color image data signals capable of reproducing a color image having a reversal-like finish which, as in a color reversal print, is characterized by reduced visibility of the graininess of a particular region such as the skin color of a human subject at the highlight, has the cyan color of the sky altered to a blue color of good appeal and has been increased in gradation hardness as a whole.

In the case described above, the particular region is extracted by the particular extracting means 80 in the reversal-like finish providing means 70 but this is not the sole case of the invention and the particular region may be extracted in the conditions setting section 48.

Described above is how the reversal-like finish providing means 70 and the image processing apparatus that uses it are basically composed.

In the illustrated image processing apparatus 14, the image processing subsection 50 of the prescanned data processing section 44 and the image processing subsection 54 of the fine scanned data processing section 46 perform different processing schemes. Alternatively, they may be designed to perform identical processing except for resolution or they may be adapted to display an as-processed image on the monitor 20.

Figure 8:
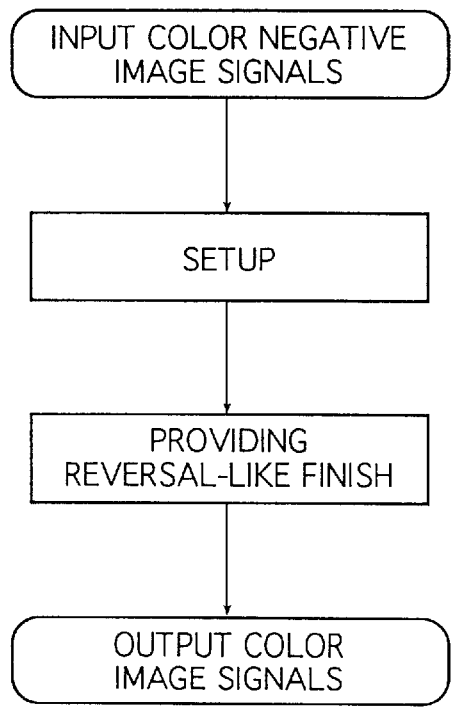
FIG. 8 is a flowchart showing another example of the image processing method of the invention.

In the illustrated case, the reversal-like finish providing means 70 in the image processing subsection 54 of the fine scanned image processing section 46 of the image processing apparatus 14 in the digital photoprinter 10 performs the image processing method of the invention to provide a reversal-like finish for a color negative image. This is not the sole case of the invention and the image processing method may be modified to have the sequence shown in FIG. 8, according to which input color negative image data signals are first set up, then subjected to the process of providing a reversal-like finish and later output.

Having described above the basic composition of the image processing apparatus that embodies the image processing method of the invention and that of the digital photoprinter using said image processing method, we now explain the operations of the image processing apparatus and the digital photoprinter.

The operator loads the scanner 12 with a carrier 28 that is adaptive to a color negative film F (or the frame to be read), sets the color negative film F in a specified position on the carrier 28 and touches the keyboard 18a in the manipulative unit 18 or moves the mouse 18b to enter the necessary command such as finishing information and the size of the prints to be prepared. If the frame to be read shows a particular picture such as a landscape scene, the operator also presses the button 18c to bring the mode of image processing by the apparatus 14 into Reversal-like Finish Providing Mode and thereafter keys in a command for starting the preparation of prints reproducing color negative images processed to have a reversal-like finish.

In response to the START command, the aperture size of the variable diaphragm 24 in the scanner 12 and the storage time of the image sensor 32 (line CCD sensors 32R, 32G and 32B) are set in accordance with the reading conditions for prescan; thereafter, the carrier 28 transports the film F in the auxiliary scanning direction at a suitable speed to start prescan; the film F is subjected to slit scan and the projected light is focused on the image sensor 32 so that the image recorded on the film F is captured photoelectrically as R, G and B separations.

In the present invention, both prescan and fine scan may be performed frame by frame. Alternatively, all frames may successively be subjected to prescan and fine scan. If desired, prescan and fine scan may continuously be performed on frame groups each consisting of a given number of frames. On the pages that follow, the case of reading the image in one frame is described for the sake of simplicity.

The output signals produced from the image sensor 32 by prescan are amplified by Amp 33 and sent to the A/D converter 34, where they are converted to digital form. The digital signals are then sent to the processing apparatus 14.

Being supplied to the image processing apparatus 14, the digital image data is processed by the scanner correcting section 36 such that it is subjected to specified correction such as that for the dark current in the image sensor 32; thereafter, the image data is sent to the log converter 38 where it is transformed with a LUT over a density range adaptive to prescan, for example, in such a manner that a density (D) range of 4 is allocated to 10-bit data, whereupon prescanned image data is obtained and stored in the prescan memory 40.

The setup subsection 58 in the conditions setting section 48 reads the stored prescanned data out of the prescan memory 40, constructs density histograms of the image, calculates image characteristic quantities such as highlight and shadow and performs any other necessary operations to set the reading conditions for fine scan, which are then supplied to the scanner 12. The setup subsection 58 also sets the conditions for various image processing schemes such as gradation adjustment, gray balance adjustment and setup and supplies them to the parameter coordinating subsection 62. Upon receiving the image processing conditions including the setup conditions, the parameter coordinating subsection 62 sets them at a specified site (hardware) in the prescanned data processing section 44 and the fine scanned data processing section 46.

If verification is to be performed, the prescanned data processing section 44 reads the prescanned image data from the prescan memory 40, processes it under the image processing conditions set in the image processing subsection 50 and subsequently converts the processed data to a suitable form in the image data converting subsection 52. The converted data is displayed as a simulated image on the monitor 20.

Looking at the presentation on the display 20, the operator checks (verifies) the image, or the result of the processing and, if necessary, manipulates the adjustment keys on the keyboard 18a to adjust the color, density, gradation and other features of the image. In addition, the operator uses the keyboard 18a or the mouse 18b to designate the particular color with reference to which the particular region is to be extracted by the particular region extracting means 80, as well as its chromaticity range.

The inputs for adjustments are sent to the key correcting subsection 60 which, in response to the entered inputs for adjustment, calculates the amounts of correction of the image processing conditions and sends them to the parameter coordinating subsection 62. The information about the designated or operator-input position and direction is sent to the key correcting subsection 60 and thence to the parameter coordinating subsection 62. In response to the supplied amounts of correction, the parameter coordinating subsection 62 corrects the LUTs, MTXs and other conditions in the image processing subsections 50 and 54. In addition, the parameter coordinating subsection 62 sends the supplied particular color and its chromaticity range to the reversal-like finish providing means 70 in the image processing subsection 54. Therefore, image displayed on the monitor 20 also varies in response to this corrective measure, or the inputs for adjustment entered by the operator.

If the operator concludes that the image in the frame of interest displayed on the monitor is appropriate (verification OK), he or she manipulates the keyboard 18a or the mouse 18b to give a command for print start, whereupon the image processing conditions are finalized and set in the scanner 12 in accordance with the reading conditions for fine scan including the aperture size of the variable diaphragm 24 and, at the same time, carrier 28 transports the film F at a suitable speed, whereby fine scan gets started.

If no verification is to be performed, the image processing conditions are finalized at the point of time when the parameter coordinating subsection 62 has set the image processing conditions in the image processing subsection 54 of the fine scanned data processing section 46, whereupon fine scan gets started.

Fine scan is performed in essentially the same manner as prescan except for the reading conditions including the aperture size of the variable diaphragm 24; the output signals from the image sensor 32 are amplified with Amp 33, converted to digital density data in the A/D converter 34 in the processing apparatus 14, subjected to specified processing in the scanner correcting section 36 and sent to the log converter 38.

In the log converter 38, the fine scanned digital image data is processed at a higher density resolving power than in prescan, typically converted with a LUT in such a manner that a density (D) range of 2 is allocated to 10-bit data, and the resulting fine scanned image data is sent to the fine scan memory 42.

In the image processing subsection 54, the color/density/gradation converting means 64 first transforms the fine scanned image data into density data, color data and gradation data in accordance with the setup conditions supplied from the parameter coordinating subsection 62 or the corrected or selected lookup table. In the next step, the saturation converting means 66 transforms the saturation data of the image signals by matrix operations. Subsequently, the electronic scaling means 68 adjusts the number of pixels in the image data signals in accordance with the size of the color image to be reproduced on color paper and, thereafter, the image signals are supplied to the reversal-like finish providing means 70.

In the reversal-like finish providing means 70, the supplied color negative image data signals are subjected to the process of providing a reversal-like finish which is the most characterizing part of the invention. More specifically, the gradation hardening means 74 in the reversal-like finish providing means 70 renders the input color negative image signals to increase in gradation hardness using the gradation transforming table designated in the parameter coordinating subsection 62 (such as the one shown in FIG. 6).

In the hue altering means 76 at the next stage, the particular color (say, the cyan color of the sky) of the gradation hardening color negative image data signals produced in the gradation hardening means 74 is subjected to hue alteration so that it is changed to a desired color (say, a blue color).

Subsequently, the hue altered negative image data signals are supplied into the sharpness enhancing means 78, where they are subjected to sharpness enhancement so as to lower the sharpness of a particular region of a particular color such as the skin color of a human subject that has been extracted by the particular region extracting means 80; as a result, there are generated negative image data signals that have been processed to provide a reversal-like finish.

The image data signals emerging from the reversal-like finish providing means 70 are reproduced on a color negative print as a color image of a reversal-like finish with a natural and pleasing impression that has been lowered in the sharpness of the particular region of the color negative image, that has the hue of the region of a particular color altered naturally to a hue of good appeal and that has been increased in gradation hardness as a whole. Such image data signals of a reversal-like finish that have been generated in the reversal-like finish providing means 70 are input to the dynamic range compress/extend means 72, where blurred image signals generated by filtering with, for example, a low-pass filter are expanded or contracted and subtracted from the original image signals so that the dynamic density range of the color image signals is compressed or extended in to match the output medium and device with which they are reproduced.

The image signals with a reversal-like finish that have been generated in the image processing subsection 54 of the fine scanned data processing section 46 are then input to the image data converting subsection 56, where they are converted to output image data. Thereafter, the image data is transferred from the image processing apparatus 14 to the image recording apparatus 16.

The image recording apparatus 16 is the combination of a printer (exposing device) that records a latent image on a light-sensitive material (photographic paper) by exposing it in accordance with the supplied image data and a processor (developing device) that performs specified processing steps on the exposed light-sensitive material and which outputs it as a print. To give one example of the printer's operation, the light-sensitive material is cut to a specified length in accordance with the size of the final print; thereafter, the printer records a back print and three light beams for exposure to red (R), green (G) and blue (B) in accordance with the spectral sensitivity characteristics of the light-sensitive material are modulated in accordance with the image data output from the processing apparatus 14; the three modulated light beams are deflected in the main scanning direction while, at the same time, the light-sensitive material is transported in the auxiliary scanning direction perpendicular to the main scanning direction so as to record a latent image by two-dimensional scan exposure with said light beams. The latent image bearing light-sensitive material is then supplied to the processor. Receiving the light-sensitive material, the processor performs a wet development process comprising color development, bleach-fixing and rinsing; the thus processed light-sensitive material is dried to produce a print; a plurality of prints thus produced are sorted and stacked in specified units, say, one roll of film.

While the image processing method of the invention has been described above in detail, it should be understood that the invention is by no means limited to the aforementioned examples and that various improvements and modifications are possible without departing from the scope and spirit of the invention.

As described above in detail, the present invention provides an improved image processing method in which a color image is read photoelectrically and the obtained color image signals are subjected to digital image processing. The method is characterized in that the color negative image, especially the whole part of a particular picture such as a landscape scene is increased in gradation hardness and then rendered to have a higher contrast and a particular color, say, the cyan of the sky, in the particular picture is altered in hue to a desired color such as a blue color of good appeal and, if necessary, the sharpness of a particular region of an important color such as the skin color of a human subject is lowered, thereby reproducing a color negative image as a color print image that has been processed to a reversal-like finish and which provides good appeal and natural impression in a satisfactory way.

What is claimed is:

1. An image processing method in which a color negative image is read photoelectrically and color negative image signals obtained by image reading are subjected to specified image processing, comprising the steps of:

if said color negative image is designated as representing a particular picture, subjecting said color negative image signals to gradation hardening process in which the gradation of said designated color negative image is rendered harder; and subjecting said color negative image signals to a hue altering process in which a particular hue in said designated color negative image is altered to a desired hue.

2. The image processing method according to claim 1, further including the step of: performing sharpness enhancing process on said color negative image signals.

3. The image processing method according to claim 2, wherein said sharpness enhancing process is performed by an unsharp masking technique or a graininess suppressing sharpness technique.

4. The image processing method according to claim 1, wherein said gradation hardening process and said hue altering process are performed on said color negative image signals after setup process is performed.

5. The image processing method according to claim 4, wherein said setup process is auto-setup process.

6. The image processing method according to claim 1, wherein said hue altering process comprises the steps of:

extracting said particular hue from RGB density signals of said color negative image signals;

converting the RGB density signals of the extracted particular hue to pseudo hue, lightness and saturation signals;

determining intensities of said hue, lightness and saturation signals;

thereafter calculating an overall intensity of said particular hue; and adding a preset amount of correction to the calculated overall intensity to generate RGB signals in which the particular hue has been altered to the desired hue.

7. The image processing method according to claim 1, wherein said particular picture is a picture of landscape.

8. The image processing method according to claim 1, wherein said particular picture is designated by external input.

9. The image processing method according to claim 1, wherein the particular hue which is subjected to said hue altering process is a cyan color of a sky and said desired hue is a blue color.

10. The image processing method according to claim 2, wherein when said sharpness enhancing process is performed on said color negative image signals, a particular region of said color negative image that has a particular color is lowered in sharpness.

11. The image processing method according to claim 10, wherein the particular color of the particular region which is to be lowered in sharpness is either the cyan color of the sky, a skin color of a human subject or both.

* * * * *